May 28, 1968     E. G. RAMBERG ET AL     3,385,184
OPTICAL SYSTEM FOR USE IN MAKING COLOR-PHOSPHOR MOSAIC SCREENS
Original Filed March 19, 1964     4 Sheets-Sheet 1
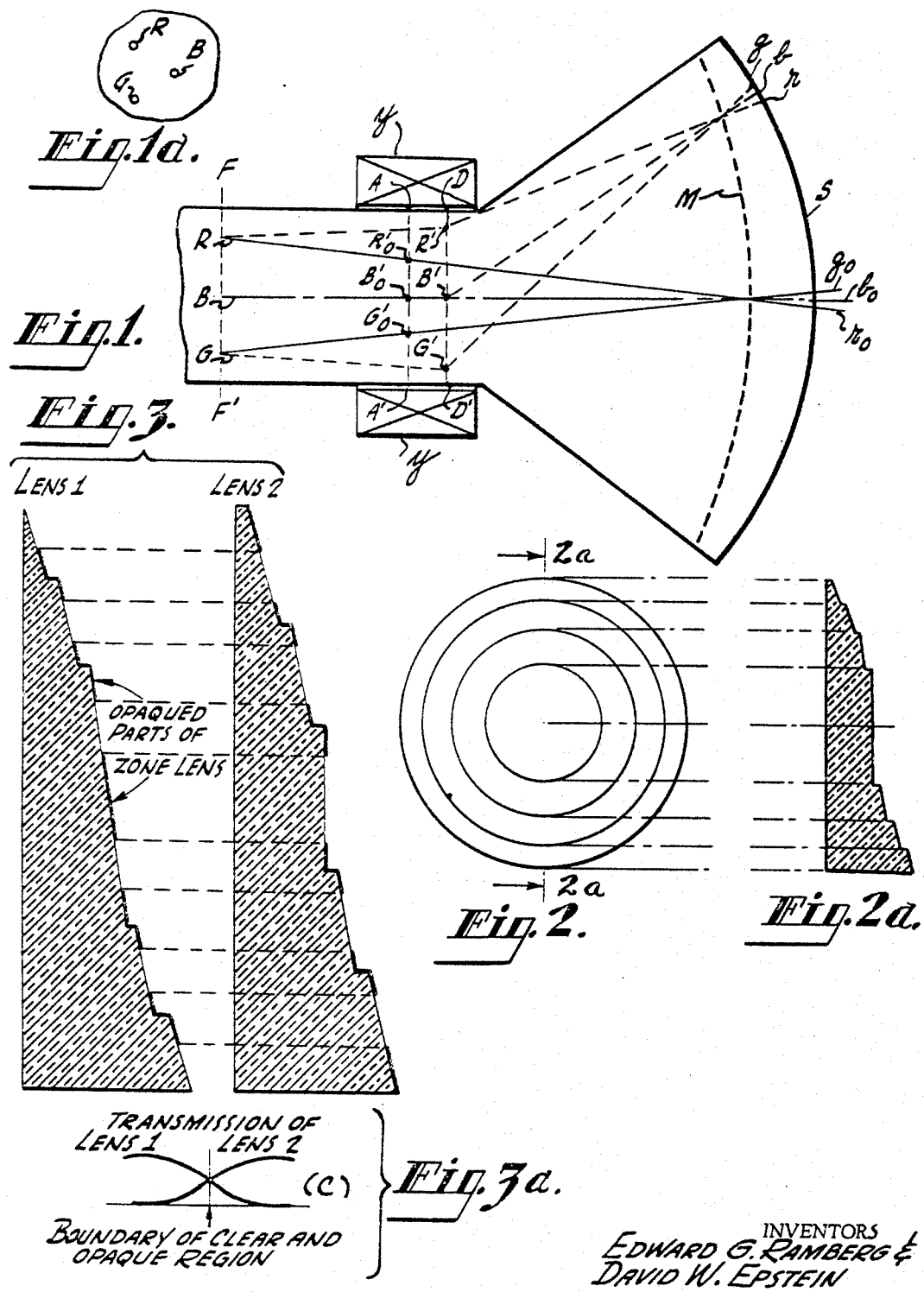
INVENTORS
EDWARD G. RAMBERG &
DAVID W. EPSTEIN
BY J. R. Webb
AGENT

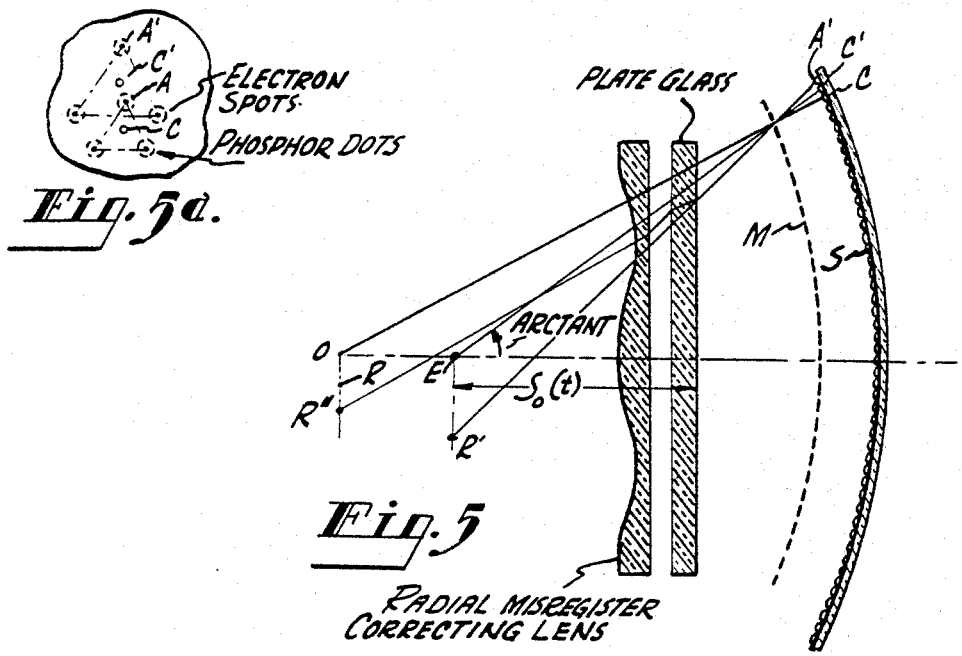
Fig. 5a.
Fig. 5.
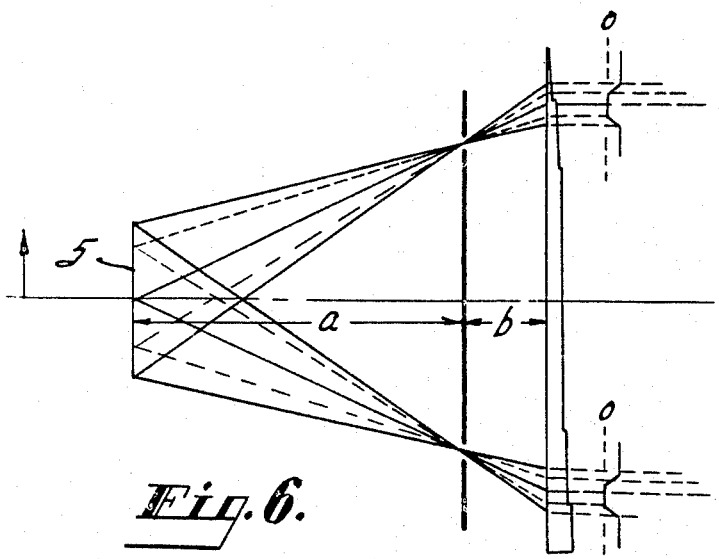
Fig. 6.
INVENTORS
EDWARD G. RAMBERG &
DAVID W. EPSTEIN
BY J. R. Webb
AGENT United States Patent Office 3,385,184
Patented May 28, 1968

3,385,184
OPTICAL SYSTEM FOR USE IN MAKING
COLOR-PHOSPHOR MOSAIC SCREENS
Edward G. Ramberg, Southampton, and David W.
Epstein, Lancaster, Pa., assignors to Radio Corporation of America, a corporation of Delaware
Original application Mar. 19, 1964, Ser. No. 353,052, now Patent No. 3,279,340, dated Oct. 18, 1966. Divided and this application Feb. 18, 1966, Ser. No. 528,506
6 Claims. (Cl. 95—1)

ABSTRACT OF THE DISCLOSURE

In the direct photographic method of laying down a mosaic of color phosphor dots upon the screen-plate of a shadow mask type color kinescope by exposing a photo sensitive layer on the screen-plate to light from a point source through the shadow mask of the tube, the so-called "de-grouping" errors incident to the use of dynamically converged electron beams are minimized by the use of one or more discontinuous zone lenses in the path of the light in the screen printing apparatus. Preferably, two zone lenses are used successively, one lens having a stepped profile consisting of alternate clear and intermediate opaque annular transmission zones and the other having a stepped profile consisting of alternate opaque and intermediate clear annular transmission zones respectively located complementarily relative to the clear and opaque zones, respectively, of the first lens.

---

This application is a division of a copending application of the same inventors, Ser. No. 353,052, filed Mar. 19, 1964, now Patent No. 3,279,340 granted Oct. 18, 1966, assigned to the same assignee.

This invention relates to an improved optical system for use in the so-called "direct photographic method" of laying down a mosaic of color phosphors upon the screen-plate of a color-kinescope. The prior art as to such optical systems is examplified by Epstein et al. U.S.P. 2,817,276 and Epstein et al. 2,885,935.

The dot-like (or line-like) phosphor-screens of color-kinescopes of the "masked target" variety are often prepared by coating the screen-plate with a photo-resist, and exposing it through the apertures in the mask to point sources of light placed, respectively, at points corresponding to the deflection centers of the three scanning beams. These deflection centers shift with the angle of deflection. When, as is usually the case, the three beams are subjected to dynamic convergence the shift consists of two components. One component is parallel to the tube axis and gives rise to a radial displacement of the electron spots with respect to the corresponding phosphor dots prepared by exposure from fixed light sources. The second component is transverse, increasing the displacement of the effective source from the tube axis without changing its azimuth. The second component gives rise to "degrouping," i.e. an increase in the size of the electron spot trios (i.e. "electron triangles") over the size of the corresponding phosphor dot trios (i.e. "phosphor triangles") with deflection.

The present invention provides lens means which, when interposed between the light sources and the apertured mask (or other optical stencil), cause the apparent light sources (as viewed through the lens) to shift in substantially the same manner with deflection angle (angle of inclination of the light ray) as the deflection centers of the electron beams shift with deflection angles of the beam.

The design of a correcting lens for source displacement parallel to the tube axis has already been fully described by Epstein, Kaus and Van Ormer in U.S.P. 2,817,276 (1955). The present disclosure is especially concerned with the design of an optical lens system which will effect an apparent source displacement corresponding to the transverse shift of the effective deflection centers. In other words, the lens system of the present invention affords correction of degrouping effects. A pair of lenses effecting the complete longitudinal and transverse displacement of the apparent light sources matching the displacement of the effective electron deflection centers can be obtained by adding the thickness of the Epstein et al. 2,817,276 "radial" correcting lens and of each "degrouping" correction lens of the present invention, at every point. As an alternative, the known radial correcting lens and the present lenses may be employed in tandem in the light box or "lighthouse" used for exposing the tube screen.

The invention is described in greater detail in connection with the accompanying four sheets of drawings, wherein:

FIG. 1 is a diagram showing, qualitatively, electron-beam paths in a tri-color kinescope of the masked-target dot-screen variety;

FIG. 1a is a sectional view taken in line A–A' of FIG. 1 showing the triangular arrangement of the three electron beams as they approach the tube's normal plane of deflection;

FIG. 2 is a plan view and FIG. 2a is a sectional view taken on the line 2a—2a of FIG. 2 of a stepped zone lens constructed in accordance with the principle and formula of the invention;

FIG. 3 is a sectional view of a set of two stepped zone lenses for use, successively, in the practice of the invention, but here shown together, the better to illustrate the complementary arrangement of the discrete clear and opaque areas or zones of both lenses;

FIG. 3a is a plot of the transmission characteristics of the clear and opaque regions of the two stepped lenses of FIG. 3;

FIG. 5 is a schematic diagram of a light box or "lighthouse" assembly containing a flat piece of glass of a thickness equal to the center thickness of one of the de-grouping lenses of FIG. 3, a radial misregister correcting lens, a mask, and a dot screen made without the use of any correcting lens;

FIG. 5a is a plot showing the relative position of the electron spots and phosphor dots on a color-screen made without the benefit of the present invention.

Figure 7:
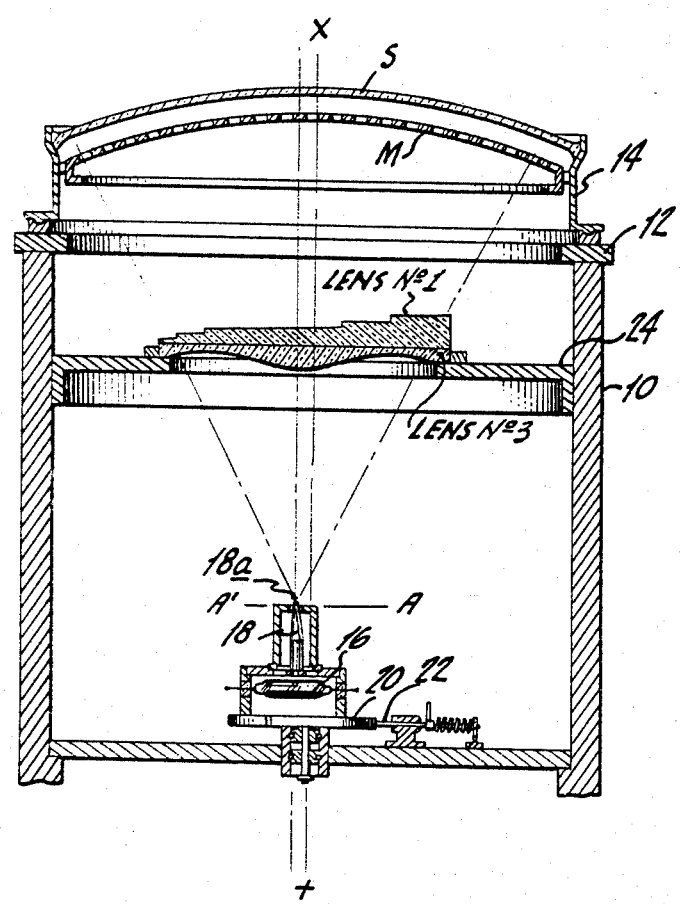

FIG. 6 is a schematic view of an apparatus for rendering selected areas of the lenses of FIGS. 2 and 3 opaque to the actinic rays used in the screen-plotting operations; and, FIG. 7 is an elevational view, partly in section, of a "lighthouse" similar to the one shown in Epstein et al. 2,817,276 but modified to include both the radial lens of that patent and first one and then the other of the two zone lenses of the present invention.

FIG. 1 shows, qualitatively, electron-beam paths in a shadow-mask kinescope projected on a plane through the longitudinal axis of the tube. The three beams R ("red"), B ("blue") and G ("green") pass through the tube's normal plane of deflection A–A' in such a fashion that, as shown in FIG. 1a, the three beam centers form an equilateral triangle in said plane. As is now conventional in this type of kinescope (see RCA Review vol. XX pp. 345-6) a converging electron-lens (or a set of converging pole pieces), not shown, with its electron-optical center in the plane F–F' is modulated electrically so that, for every deflection angle, the three beams converge at the mask M of the tube. In this drawing (i.e. FIG. 1) the center lines of the three beams are shown (both at the center and edge of the raster) as passing through the same mask aperture. If we now consider a hypothetical beam incident along the tube axis (identical, in the drawing with the projection of the "blue" beam B) then this hypothetical ray when projected rearwardly as a straight line from its point of incidence on the screen S will intersect the tube axis in a point. The plane D–D' perpendicular to the tube axis through this point is defined as the instantaneous plane of deflection. The intersections with this plane D–D' of the center lines of the incident beams continued as straight lines, namely R', B', G', are defined as the effective centers of deflection of the three beams. The centers of the beam intersections with the screen, $g$, $b$, $r$, may be found, for any one mask aperture, by connecting with straight lines the three effective centers of deflection for the deflection angle in question with the center of the aperture and continuing the resulting straight lines to the screen surface.

The position of the instantaneous plane of deflection D–D' is a function of the angle of deflection. The effective center of the deflection yoke Y moves forward by a distance which, for small deflection angles, is proportional to the square of the tangent of the angle of deflection. At the same time, the yoke Y has a converging action which increases with angle of deflection. To compensate for this converging action and maintain the desired convergence at the mask or screen, the converging action of the fields or lens in the plane F-F' is reduced as a function of deflection angle. This results in a transverse displacement of the deflection centers $R_o'$ 'R', $B_o'$ 'B', $G_o'$ 'G' which is proportional, over a large range of deflection angles, to the square of the tangent of the deflection angle. Accordingly, the three deflection centers form a triangle in the instantaneous plane of deflection, which expands with increasing angle of deflection. Since the electron spot trio centers on the screen may be regarded as projections of the three deflection centers through the mask aperture center corresponding to the trio in question, the trio centers on the screen also form triangles of increasing size if the separation between mask and screen is constant. In order to obtain uniform coverage of the screen with the spot trios the screen S is given a greater curvature than the mask M, decreasing the distance between them with increasing distance from the tube axis. (As to this see Epstein et al. U.S. Patent 2,885,935, FIG. 14.)

The set of phosphor dots corresponding to the electron spots from one particular beam are fixed on the screen by exposing a photosensitive layer on its surface through the mask M to a small light source centered on the deflection center for the beam in question. To obtain accurate centering between the phosphor dots and the electron spots the effective position of the light source is moved, along with the displacement of the effective deflection center, as the radius of the exposed ring zone on the screen is changed. In principle this could be accomplished by physically displacing the source and simultaneously changing the exposed zone with the aid of masks. It is more convenient, however, to hold the source fixed, e.g. at the deflection center corresponding to very small angles of deflection, and to interpose a lens between the deflection plane and the mask, which causes the source, as seen from any one mask aperture, to appear to be at the deflection center corresponding to that aperture.

Since both the displacement of the deflection plane along the axis and the transverse displacement of the effective deflection centers are relatively small (fractions of an inch), it is permissible to consider the lenses required for these two deflection center displacements separately. To a close approximation, the two lenses required for the individual corrections used in tandem, or combined into a single lens by addition of their thicknesses, will provide the desired total correction. A more precise prescription for the design of the lenses, applicable e.g. when the shift of the deflection plane is large, is given later on in this specification.

Prescriptions for the design of lenses which will yield the desired displacement of the apparent sources parallel to the axis are given by Epstein et al. in U.S. Patent 2,817,276. Such lenses are, in general, axially symmetric aspheric lenses. Furthermore, Epstein et al., in U.S. Patent 2,885,935, have described lenses with a different symmetry which will produce a transverse shift of the apparent source. However, it can be shown mathematically that this transverse shift of the apparent source is a function of azimuth as well as of deflection angle, so that the shift of the deflection center can be simulated only approximately. (The azimuth is the angle of any meridional plane wtih that meridional plane which contains the particular source.) In fact, for a flat, thin lens with continuous surfaces, the only displacement of the apparent source which is independent of azimuth is a fixed displacement. To attain such a fixed displacement $\Delta g$, the thickness variation $D(r\phi)$ must have the following functional relationship:

$$D(r\phi) = Dg(r) \sin \phi + Dg(r)_{max}. \quad (1)$$

with $$Dg(r) = -\frac{\Delta g \cdot t}{\sqrt{n^2+(n^2-1)t^2}-1} = \frac{\Delta g \cdot r}{\sqrt{n^2 s_o^2+(n^2-1)r^2}-s_o} \quad (2)$$

Here $r$ is the distance from the tube axis, $\phi$ the azimuthal angle (direction of source displacement: azimuth $\phi = 90°$); $n$ the refractive index of the lens; $s_o$ the distance between the source and the lens; and $t = r/s_o$ the tangent of the deflection angle. It will be noted that for azimuths greater than 180° the thickness becomes negative. Thus to realize the lens physically, it is necessary to add to $D(r\phi)$ a constant thickness of lens at least equal to $D_g(r)_{max}$. This added thickness of glass acts as a weak axially symmetric lens and is regarded as part of the lens for correcting the longitudinal displacement of the deflection plane.

The correcting lenses which, in the present invention, are employed to produce the desired transverse displacement of the apparent source have a discontinuous surface, with zones obeying Equation 2, with a series of different values of $\Delta g$. If the number of zones is $n$, the values of $\Delta g$ are chosen to be $$\Delta g_m = \frac{m - 1/2}{n} \Delta g_{max}, \quad m = 1, 2, 3 \ldots n \quad (3)$$

Here $\Delta g_{max}$ is the maximum value of the desired displacement, corresponding normally to the maximum deflection angle. The boundaries of the zones are given by the values of $r = r_m$ fulfilling the relation:

$$\Delta g(r_m) = (m/n) \Delta g_{max}. \quad (4)$$

where $\Delta g(r) = \Delta g(t)$ is the desired variation of the transverse displacement with the tangent of the deflection angle $t$ or the lens radius $r = s_o t$. If such a lens were ground perfectly, the maximum error in source displacement would be $\Delta g/_{max}.(2n)$. The degrouping error would be reduced by it by a factor equal to the reciprocal of twice the number of lens zones.

Actually, however, it is scarcely feasible to grind and polish a zone lens of the type described to any degree of perfection close to the discontinuities. The discontinuities would both obscure some of the apertures in the mask and scatter light rays with an undesired direction of incidence toward others. Consequently a pair of lenses (see FIG. 3) are employed, each with approximately half the total number of zones. Each lens has a plurality of alternate annular clear zones and intermediate annular opaque zones or regions between its clear zones. The thickness of the clear zones varies across each annular zone, with the maximum variation occurring along the meridional plane shown in FIGS. 2a and 3. As will hereinafter more fully appear in connection with the description of FIG. 7, in laying down the color-phosphor mosaic on the target surface of the screen each phosphor bearing photosensitive layer is exposed, in succession, through each of the stepped lenses for an equal period of time.

As indicated in FIG. 3a, the boundaries of the opaquing are preferably shaded off in such a fashion that the sum of the transmissions through the two lenses at the same value of the radius $r$ is constant and close to 1. The shading renders the centering of the lenses less critical. It will be noted that now, the grinding and polishing in the opaqued regions near the transition points can be adjusted to the convenience of the lens maker and that the discontinuities may be rounded off at will. The lenses may be either be ground in one piece on a machine of the type described by Briggs in U.S. Patent 2,855,832, or the several zones may be ground individually on the same type of machine and then fitted together. In FIG. 3 the thickness of the lenses is enormously exaggerated. The two lenses shown in FIG. 3 are equivalent to a single lens with six zones and will thus reduce the maximum degrouping error by a factor of 1/12. More generally, the specifications for a pair of lenses equivalent to a single lens with $n$ zones are given below:

Lens 1

Fixed source displacements for the indivdual zones, enumerated by the index $m_1$:

$$\Delta g_{m1} = \frac{2m_1 - 3/2}{n} \Delta g_{max}; \quad m_1 = 1, 2, \ldots n/2 \text{ for } n \text{ even}$$
$$(n+1)/2 \text{ for an } n \text{ odd}$$

Upper limit of zone (position of discontinuity), $r_{m1}$ $$\Delta g(r_{m1}) = \frac{2m_1 - 1/2}{n} \Delta g_{max}.$$

Boundaries of transparent zone, $r_{b1-}$ and $r_{b+}$ $$\Delta g(r_{b1-}) = \frac{2m_1 - 2}{n} \Delta g_{max}; \quad \Delta g(r_{b1+}) = \frac{2m_1 - 1}{n} \Delta g_{max}.$$

Lens 2

Fixed source displacements for the individual zones, enumerated by the index $m_2$:

$$\Delta g_{m2} = \frac{2m_2 - 1/2}{n} \Delta g_{max}; \quad m_2 = 1, 2, \ldots n/2 \text{ for } n \text{ even}$$
$$(n-1)/2 \text{ for } n \text{ odd}$$

Upper limit of zone (position of discontinuity), $r_{m2}$ $$\Delta g(r_{m2}) = \frac{2m_2 + 1/2}{n} \Delta g_{max}.$$

Boundaries of transparent zone, $r_{b2-}$ and $r_{b2+}$ $$\Delta g(r_{b2-}) = \frac{2m_2 - 1}{n} \Delta g_{max}; \quad \Delta g(r_{b2+}) = \frac{2m_2}{n} \Delta g_{max}.$$

As a typical example, assume that measurements of the degrouping error in a color kinescope with 90° total deflection indicate a variation in the transverse displacement of the deflection center with the tangent $t$ of the deflection angle which displacement is given by:

$$\Delta g = 0.2t^2 \text{ inch} \tag{11}$$

Figure 4:
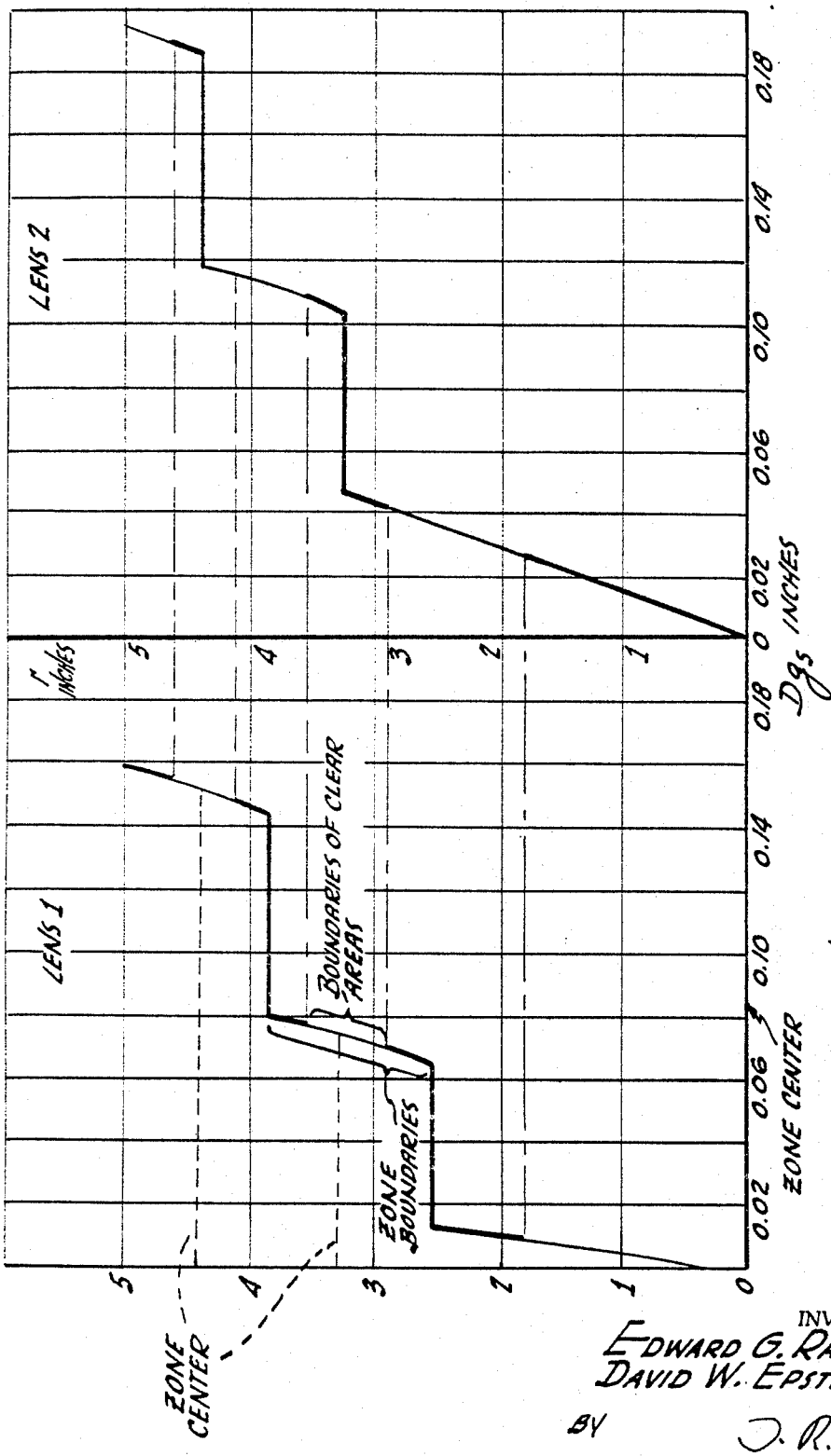
FIG. 4 is a chart of the profiles of the two lenses of FIG. 3, in a meridional plane containing the source.

Assume furthermore that a correcting lens, lens 1 or lens 2, is to be placed a distance of 5 inches from the light source, so that $r = 5t$. If the maximum degrouping error is to be reduced by a factor of 1/12, corresponding to a source displacement of 0.0167 inch, this requires two complementary three zone lenses. The profiles of these lenses, in the $\phi = 90°$ azimuth, are shown in FIG. 4, while their numerical dimensions are given in the table below:

| Zone | Zone "Center" | | Zone Boundaries | | | Boundaries of Clear Areas | |
|---|---|---|---|---|---|---|---|
| | $\Delta g$, inch | $t$ | $t$ | $r$, inches | $\Delta g$, inches | $t$ | $r$, inches |
| 1 | 0.00833 | 0.204 | | | | 0.288 | 2.03 |
| | | | 0.354 | 2.56 | 0.0049 | | |
| | | | | | 0.0244 | 0.408 | 2.88 |
| 2 | 0.04167 | 0.456 | | | | 0.500 | 3.53 |
| | | | 0.540 | 3.81 | 0.0332 | | |
| | | | | | 0.0598 | 0.577 | 4.08 |
| 3 | 0.075 | 0.612 | | | | 0.646 | 4.57 |
| | | | 0.707 | 5.00 | 0.0899 | | |
| Lens 2: | | | | | | | |
| 1 | 0.025 | 0.354 | | | | 0.288 | 2.03 |
| | | | | | | 0.408 | 2.88 |
| | | | 0.456 | 3.22 | 0.0179 | | |
| | | | | | 0.0416 | 0.500 | 3.53 |
| 2 | 0.05833 | 0.540 | | | | 0.577 | 4.08 |
| | | | 0.612 | 4.33 | 0.0503 | | |
| | | | | | 0.0790 | 0.646 | 4.57 |
| 3 | 0.09167 | 0.677 | 0.707 | 5.00 | 0.0853 | | |

In the above table, $D_g$ is the thickness of the lens in the azimuth $\phi = 90°$, assuming $n = 1.54708$.

*Determination of desired transverse source displacement $\Delta g$ and effective source-to-lens distance $s_0$ from observed degrouping error*

Referring now to FIG. 5: Assume that a dot screen $s$ has been prepared without correcting lenses and is inserted in a tube and that the electron spots formed by the three beams are observed on the tube screen. Assume furthermore that the positioning of the sources during exposure corresponded to the deflection centers of the three beams for very small angles of deflection. Then the spot trios near the center of the screen will be exactly centered on the corresponding phosphor dots. Now consider the spot and dot trios some distance from the axis, in azimuthal plane through one of the sources. Here, as shown in FIG. 5a, the center $C'$ of the beam spot trios and the center $C$ of the corresponding phosphor dot trios are displaced by a distance $CC'$ and the spot and dot centers for the source in the meridional plane, by a distance $AA'$. $C$ and $C'$ are e.g. the intersections of the three angle bisectors of the triangles formed by the centers of the three dots and the corresponding three electron spots, respectively. $CC'$ is then the radial misregister error. The difference of $AA'$ and $CC'$ is the degrouping error. The problem is to correct these two errors by two lenses, whose position is set in advance, usually approximately half-way between mask and deflection plane.

First design the radial misregister correcting lens. For this purpose replace the degrouping correcting lens with a piece of plate glass (FIG. 5) with a thickness equal to the center thickness of the degrouping correcting lens; this thickness may be made slightly larger than an estimated value of $D_{gmax}$. Rays are traced from $C'$ through the corresponding mask aperture center and the plate of glass, one surface of the radial misregister correcting lens being given such a slope as to direct the ray to the intersection $O$ with tube axis of the plane containing the sources, that is, the deflection plane for negligibly small deflection angles. This process of ray tracing is described in greater detail in Epstein, et al. U.S. Patent 2,817,276. By tracing a series of such rays the profile of the radial misregister correcting lens (i.e. "lens 3") is established.

As shown in FIG. 5, the ray from C' through the center of the corresponding aperture, continued as a straight line, meets the tube axis in the point E. The distance from E to the front surface of the flat piece of glass is the value of $S_0(t)$ for the ray inclination in question $t$. A straight line from A' through the same aperture center intersects the normal plane through E at R'. A ray from A' through the same aperture center after refraction by the flat piece of glass and the radial misregister lens, meets the normal plane through 0 at R''. If R is the source position corresponding to A', the desired displacement $\Delta g(t)$ of the source becomes:

$$RR'' \frac{ER'}{OR''} \qquad (12)$$

Equation 2 establishes the proper thickness vibration of a zone giving exact degrouping correction for the inclination $t$. By repeating the operation of a series of suitably spaced distances from the center of the screen, this procedure establishes the desired zone structure for the entire lens.

It should be noted that a similar procedure may be applied also in the case of focusing mask tubes, in which fields are applied between the mask and screen, so that the electron paths are curved here as well as within the deflecting field. The procedure is also applicable for in-line guns as well as the delta configuration, here considered in greater detail.

*Opaquing of the degrouping correcting lenses.*—The opaquing of the transition regions of the degrouping lenses can be applied either on the flat side or on the discontinuous side of the lens. Furthermore, the proper grading of the transmission can be established either by evaporation of absorbing material in vacuum or by the exposure of a photographic emulsion applied e.g. to the flat side of the degrouping correcting lens. FIG. 6 shows an arrangement for applying the graded absorbing layer photographically. A circular disk light source 5 with intensity decreasing from the center outward is placed on the axis of the lens (corresponding to the tube axis). Between the lens and the source, at a distance $b$ from the lens and a distance from the source, is placed a diaphragm with a narrow ring-aperture, the opaque center section being supported by a "spider" of thin wires bridging the ring aperture. The average radius of the ring aperture is made equal to $a/(a+b)$ times the radius of the center of the lens zone to be opaqued. If the width of the zone to be opaqued in the absence of a transition region is $2x_0+L$ and the width of the desired transition region is L, the diameter o fthe circular light source should be $(a/b)(2x_0+2L)$. If we desire a linear variation of the transmission (e.g. from 1 at the edge of the zone to 0 at the inner boundary of the transition-region) and if the density of the developed emulsion is proportional to the exposure it can be shown that the variation in brightness of the source should be given by:

$$B = \text{const.} \frac{1}{\sqrt{r^2 - a^2 x_0^2/b^2}} \left\{ \arctan \frac{(a^2/b^2)x_0(x_0+L) - r^2}{\sqrt{r^2 - a^2 x_0^2/b^2}\sqrt{(a^2/b^2)(x_0+L)^2 - r^2}} + \pi/2 \right\} \qquad (13)$$

for $(a/b)x_0 < r < (a/b)(x_0+L)$.

At the lower limit of this range of $r$, the expression for the brightness becomes infinite. Before this point is reached the brightness in the actual source attains a limiting value, which can be maintained right up to the center of the source. To obtain more complete opacity, a ring of black lacquer may be applied to the central portion of the opaqued zone after development of the photographic layer. To reduce the effect of possible scattering of reflected light from the imperfectly polished transition regions, these regions should be blackened.

Since, in general, the width of the zones to be opaqued decreases with increasing lens radius, it is generally convenient to move the diaphragm closer to the lens (and increase the radius of the ring aperture simultaneously as needed) for the exposure of the outlying zones; if the same light source is employed throughout, the transition zone widths then decrease simply in the same ratio as the opaqued-zone widths. To obtain equal exposure times for the different zones, the width $ds$ of the ring apertures should be made such that the quantity $$\frac{1}{(a+b)b} ds \cos^4 \phi \qquad (14)$$

remains constant. Here $\phi$ is the angle of inclination of the light rays from the center of the light source. The above procedure, applied to both complementary lenses, leads to an approximately uniform sum of transmission for the entire lens area.

A "lighthouse" similar to the one shown in Epstein et al. 2,817,276 may be used in laying down the color-phosphor mosaics on the target surface of the screen-plate. Such a "lighthouse" is shown in FIG. 7. It comprises a pedestal 10 having an open top 12 upon which the front end or top-cap 14 of the kinescope is supported with the center of the screen-plate S and mask M on the central axis X—X of the pedestal. A source of light comprising an ultra-violet lamp 16 and a quartz rod 18 is mounted on a turntable 20 adjacent to the base of the pedestal, for rotation about the central axis X—X. The terminal 18a of the quartz rod 18 preferably lies in a plane A–A' corresponding to the tubes normal plane-of-deflection and a suitable indexing mechanism, indicated generally at 22, may be provided for bringing the terminal 18a selectively to the three positions corresponding to the color-centers of the three beams in said plane. An annular shelf 24 within the pedestal 10 serves as support for the radial misregister and degrouping correcting lenses. The curved surface of the radial misregister lens ("lens 3") is preferably presented to the source of the light so that its plane (upper) surface may serve, selectively, as a support for the degrouping lenses.

The exposure of the screen with the radial misregister and degrouping correcting lenses is carried out as follows: The radial misregister lens is kept permanently fixed in position, say, on the axis of the lighthouse. Then, with the photosensitive layer 24 for the green dots on the screen surface, the light source is placed in the appropriate position for the green beam and the degrouping correcting lens No. 1 is oriented so that its 90° azimuth corresponds to the source position. The screen is then exposed. Then Lens No. 1 is exchanged with Lens No. 2 with the same orientation and the exposure is repeated for an equal length of time. The green dots on the screen are then developed and fixed. Next, the screen is coated with the photosensitive emulsion corresponding to the red dots, the source is rotated along with Lens No. 2 to the position for the red beam and an exposure is made, followed by a second exposure of equal length with Lens No. 1 replacing Lens No. 2. Then the red dots are developed and fixed and the process is repeated for the blue dots.

What is claimed is:

1. A set of optical lenses for use, successively, in laying down respectively different annular areas of a phosphor mosaic on the screen plate of a cathode-ray tube of the kind that utilizes an electron-beam whose effective center of deflection of displaced from the axis of said tube as a function of deflection angle, said set of lenses comprising:

a first lens having a stepped profile consisting essentially of alternate clear and intermediate opaque annular transmission zones, and a second lens having a stepped profile consisting essentially of alternate opaque and intermediate clear annular transmission zones located complementarily relative to said clear and opaque zones, respectively, of said first lens, the thickness of said clear zones being variable across each zone.

2. The invention as set forth in claim 1 and wherein the marginal portions of said complementarily located clear and opaque transmission zones of said first and second lenses exhibit complementarily graded barriers to the transmission of light rays therethrough.

3. The invention as set forth in claim 1 and wherein the width of said clear and said opaque transmission zones decreases as measured outwardly from the center to the edge of the stepped profile of each of said lenses.

4. The invention as set forth in claim 1 and wherein the optical properties of each of said clear transmission zones is peculiar to that particular transmission zone.

5. Apparatus for laying down by the direct photographic method a mosaic of color phosphor areas upon the screen plate of a color kinescope in which a plurality of electron beams are subjected to deflection and convergence forces during the scanning of said screen, said apparatus comprising a light source positioned to illuminate said screen through an apertured mask located between said source and said screen to fix the location of said areas, and a stepped degrouping correction lens having a plurality of alternate clear and intermediate opaque transmission zones interposed between said light source and said apertured mask, the thickness of said clear zones being variable across each zone.

6. In an optical system for use in the direct photographic method of laying down a mosaic of color-phosphors upon the screen plate of a color-kinescope of the kind that utilizes an electron-beam whose instantaneous effective center of deflection is displaced from the axis of symmetry of said kinescope as a function of deflection angle; a light source positioned to illuminate said screen through an apertured mask located between said source and said screen to fix the location of said areas, and a stepped "degrouping" correction lens having a plurality of alternate clear and intermediate opaque transmission zones interposed between said light source and said apertured mask, each of said clear zones producing a fixed displacement $\Delta g$ of the apparent light source in a plane corresponding to the deflection plane of said color-kinescope, the thickness variation of said lens in each clear zone being given by the formula:

$$D(r\phi) = Dg(r) \sin \phi + Dg(r) \text{ max.}$$

wherein $Dg(r)$ is defined by the formula:

$$dg(r) = -\frac{\Delta g \cdot t}{\sqrt{n^2 + (n^2-1)t^2} - 1} = -\frac{\Delta g \cdot t}{\sqrt{n^2 s_0^2 + (n^2-1)r^2} - s_0}$$

where:

$r$ is the distance of a point on the lens from the tube axis,
$\phi$ is the azimuthal angle (direction of source displacement: azimuth $\phi = 90°$)
$n$ is the refractive index of the lens
$s_0$ is the distance between the source and the lens and
$t = r/s_0$ the tangent of the deflection angle and wherein the variation of $\Delta g$ with the mean radius $\bar{r}$ of each transmission zone corresponds to the displacement of the deflection center of said electron-beam with said deflection angle is given by $$\bar{r} = \frac{r}{s_0}$$

References Cited

UNITED STATES PATENTS 2,817,276  12/1957  Epstein et al. _____ 95—1

NORTON ANSHER, *Primary Examiner.*

JOHN M. HORAN, *Examiner.*

RICHARD M. SHEER, *Assistant Examiner.*

UNITED STATES PATENT OFFICE
CERTIFICATE OF CORRECTION

Patent No. 3,385,184                                         May 28, 1968

Edward G. Ramberg et al.

It is certified that error appears in the above identified patent and that said Letters Patent are hereby corrected as shown below:

Column 4, line 47, equation (3), after "$\Delta g_m$" insert an equa sign; line 63, "$\Delta g/max(2n)$" should read -- $\Delta g_{max}/(2n)$ --. Colum 5, lines 32 to 34, to the right of the equation insert -- (5) -- lines 35 to 38, to the right of the equation insert -- (6) --; lines 40 to 42, to the right of the equation insert -- (7) --; lines 48 and 49, to the right of the equation insert -- (8) --; same equation (8), after "$\Delta g_{m2}$" insert an equal sign --; lines 51 to 54, to the right of the equation insert -- (9) --; lines 56 to 59, to the right of the equation insert -- (10) --. Colum 6, in the table, first column, above line 1 thereof, insert -- Lens 1: --. Column 7, line 16, "vibration" should read -- variation --; line 42, after "distance" insert -- a --. Column line 64, "of", second occurrence, should read -- is --. Column 10, lines 24 to 26, the equation should appear as shown below:

$$t = \frac{\bar{r}}{S_o}$$

Signed and sealed this 3rd day of February 1970.

(SEAL)
Attest:

EDWARD M. FLETCHER, JR.                          WILLIAM E. SCHUYLER, JR.
Attesting Officer                                            Commissioner of Patents